(12) United States Patent
Westerhoff et al.

(10) Patent No.: US 12,409,693 B2
(45) Date of Patent: Sep. 9, 2025

(54) SPRING ASSEMBLY FOR A CHASSIS, VEHICLE CHASSIS COMPRISING A SPRING ASSEMBLY, METHOD FOR PRODUCING A SPRING ASSEMBLY FOR A VEHICLE CHASSIS AND USE OF A SPRING ASSEMBLY

(71) Applicants: ThyssenKrupp Federn und Stabilisatoren GmbH, Hagen (DE); thyssenkrupp AG, Essen (DE)

(72) Inventors: Karsten Westerhoff, Hattingen (DE); Jan-Yves Schrage, Attendorn (DE); Marcel Gross, Dortmund (DE)

(73) Assignees: ThyssenKrupp Federn und Stabilisatoren GmbH, Hagen (DE); thyssenkrupp AG, Essen (DE)

( * ) Notice: Subject to any disclaimer, the term of this patent is extended or adjusted under 35 U.S.C. 154(b) by 338 days.

(21) Appl. No.: 17/921,307

(22) PCT Filed: Apr. 26, 2021

(86) PCT No.: PCT/EP2021/060770
§ 371 (c)(1),
(2) Date: Oct. 25, 2022

(87) PCT Pub. No.: WO2021/219522
PCT Pub. Date: Nov. 4, 2021

(65) Prior Publication Data
US 2023/0286342 A1    Sep. 14, 2023

(30) Foreign Application Priority Data

Apr. 27, 2020   (DE) .................... 10 2020 205 313.8

(51) Int. Cl.
B60G 11/16    (2006.01)
F16F 1/12     (2006.01)

(52) U.S. Cl.
CPC .............. *B60G 11/16* (2013.01); *F16F 1/126* (2013.01); *B60G 2204/124* (2013.01)

(58) Field of Classification Search
CPC ..... B60G 11/16; B60G 2204/124; F16F 1/126
See application file for complete search history.

(56) References Cited

U.S. PATENT DOCUMENTS

2014/0225319 A1    8/2014  Schussler et al.
2016/0333956 A1   11/2016  Teichmann et al.
(Continued)

FOREIGN PATENT DOCUMENTS

CN          206129954 U     4/2017
DE    10 2005 050 023 A1    5/2007
(Continued)

OTHER PUBLICATIONS

English Translation of International Search Report issued in PCT/EP2021/060770, dated Jul. 14, 2021.
(Continued)

*Primary Examiner* — Vishal R Sahni
(74) *Attorney, Agent, or Firm* — thyssenkrupp North America, LLC

(57) ABSTRACT

A spring assembly for a vehicle chassis may include a spring that features a coating, a spring support, and an intermediate layer. The intermediate layer can be arranged between the spring and the spring support. The intermediate layer may be at least materially connected to the spring, in particular to the coating on a side facing the spring. The intermediate layer lies entirely or partially against the spring support on a side facing away from the spring and is connected to the spring support by a connection other than a material connection.

18 Claims, 3 Drawing Sheets

(56) References Cited

U.S. PATENT DOCUMENTS

| | | | |
|---|---|---|---|
| 2017/0015171 | A1 | 1/2017 | Enomoto et al. |
| 2019/0160906 | A1 | 5/2019 | Umeno |
| 2020/0391565 | A1 | 12/2020 | Kaisha |
| 2021/0339592 | A1 | 11/2021 | Shibata et al. |
| 2023/0026766 | A1 | 1/2023 | Suwa et al. |

FOREIGN PATENT DOCUMENTS

| | | | | |
|---|---|---|---|---|
| DE | 10 2007 003 782 | A1 | | 7/2008 |
| DE | 10 2008 046 939 | A1 | | 5/2009 |
| DE | 10 2009 052 030 | A1 | | 5/2011 |
| DE | 10 2011 002 065 | A1 | | 10/2012 |
| DE | 10 2015 208 978 | B4 | | 11/2016 |
| DE | 10 2016 200 307 | A1 | | 1/2017 |
| DE | 10 2015 218 944 | A1 | | 3/2017 |
| DE | 10 2017 202 212 | A1 | | 8/2018 |
| EP | 2 697 084 | B1 | | 2/2014 |
| EP | 3 109 500 | B1 | | 12/2016 |
| EP | 3 124 821 | A1 | | 2/2017 |
| EP | 3 495 177 | A1 | | 6/2019 |
| EP | 4 130 506 | A1 | | 2/2023 |
| FR | 2 637 338 | A1 | | 4/1990 |
| JP | S59-114308 | U | | 8/1984 |
| JP | H10315731 | A | | 12/1998 |
| JP | 2015-190538 | A | | 11/2015 |
| JP | 2019-148273 | A | | 9/2019 |
| JP | 2019-157997 | A | | 9/2019 |
| JP | 2020-029948 | A | | 2/2020 |
| JP | 6937861 | B1 | * 9/2021 | .............. F16F 1/126 |
| KR | 20080101120 | A | * 11/2008 | |
| WO | 2019/172327 | A1 | | 9/2019 |
| WO | 2019/238959 | A1 | | 12/2019 |

OTHER PUBLICATIONS

Sika Schweiz AG: Produktionsblatt SikaForce—7550 L15 (translation will be provided).

* cited by examiner

SPRING ASSEMBLY FOR A CHASSIS, VEHICLE CHASSIS COMPRISING A SPRING ASSEMBLY, METHOD FOR PRODUCING A SPRING ASSEMBLY FOR A VEHICLE CHASSIS AND USE OF A SPRING ASSEMBLY

CROSS REFERENCE TO RELATED APPLICATIONS

This application is a U.S. National Stage Entry of International Patent Application Serial Number PCT/EP2021/060770, filed Apr. 26, 2021, which claims priority to German Patent Application No. DE 10 2020 205 313.8, filed Apr. 27, 2020, the entire contents of both of which are incorporated herein by reference.

FIELD

The present disclosure generally relates to spring assemblies for a chassis, to vehicle chassis comprising a spring assembly, and to methods for producing a spring assembly for a vehicle chassis.

BACKGROUND

Spring assemblies for chassis are known in a large number of embodiments in the prior art. The springs used are usually helical springs, which are also referred to, for example, as coiled torsion springs, in particular compression springs, which are wound more or less cylindrically from spring wire. These helical springs serve in chassis as an elastic connection between the wheel axles and the vehicle body. Such helical springs, together with other devices, generally contribute to improving ride comfort by protecting the vehicle body and vehicle occupants from shocks caused by road surface unevenness and from vibrations resulting therefrom. Furthermore, especially at high driving speeds, such helical springs contribute to optimized driving dynamics, that is to say to as far as possible uniform ground adhesion of the wheels and thus, in particular, to driving safety. These helical springs are provided with a protective layer, in particular a paint, particularly for protection against environmental influences, which can cause corrosion, for example. The spring is arranged on a spring support for guiding the spring and for noise insulation. Arranged on the side of the spring support facing away from the spring is a spring plate, on which the spring is supported via the spring support. It is problematic if dirt penetrates into the region between the spring and the spring support and damages the paint on the spring, in particular by abrasion, in such a way that the surface of the spring wire becomes accessible to environmental influences and is susceptible to corrosion. Under the long-term effect of environmental influences and severe corrosion, this may also lead to the helical spring concerned breaking. For example, as a result of the constant work in the lower support due to the vehicle movements, the paint is missing on the lowest turn of the compression spring, and, as a result of environmental influences, there is rust damage, which additionally weakens the spring and promotes spring breakage.

DESCRIPTION OF RELATED ART

DE 10 2015 208 978 discloses a spring assembly having an adhesive layer which bonds the spring to the spring support.

Thus a need exists for an improved spring assembly and an improved method for producing a spring assembly, in which the abovementioned disadvantages are avoided. In particular, this improved spring assembly and the improved method for producing a spring assembly are intended to reduce the susceptibility to corrosion resulting from the introduction of dirt into a spring assembly and, in particular, to breakage of the helical spring resulting therefrom. In particular, the intention is to at least partially reduce paint damage caused by abrasion on the helical spring of a spring assembly. Furthermore, a need exists for the improved method for producing a spring assembly to provide a stable manufacturing process. Moreover, it should be possible to implement the improved method for producing a spring assembly in a simple and reliable manner in already existing methods.

SUMMARY

A spring assembly for a vehicle chassis may be summarized as comprising: a spring that has a coating; a spring support that has an adhesive-repellent supporting region for supporting the spring; and an intermediate layer arranged between the spring and the spring support, wherein the intermediate layer includes an elastic adhesive; wherein the intermediate layer is at least materially connected to the coating on a side facing the spring; wherein the intermediate layer lies entirely or partially against the spring support on a side facing away from the spring and is connected to the adhesive-repellent supporting region of the spring support by a connection other than a material connection; wherein the connection is a positive connection configured with a positive element and a negative receptacle that receives the positive element; wherein either: the intermediate layer is received as the positive element in cavities of the spring support that form the negative receptacle, or projections with undercuts of the spring support form the positive element, with the positive element being received in the negative receptacle, wherein cavities in the intermediate layer form the negative receptacle.

DETAILED DESCRIPTION

Figure 1:
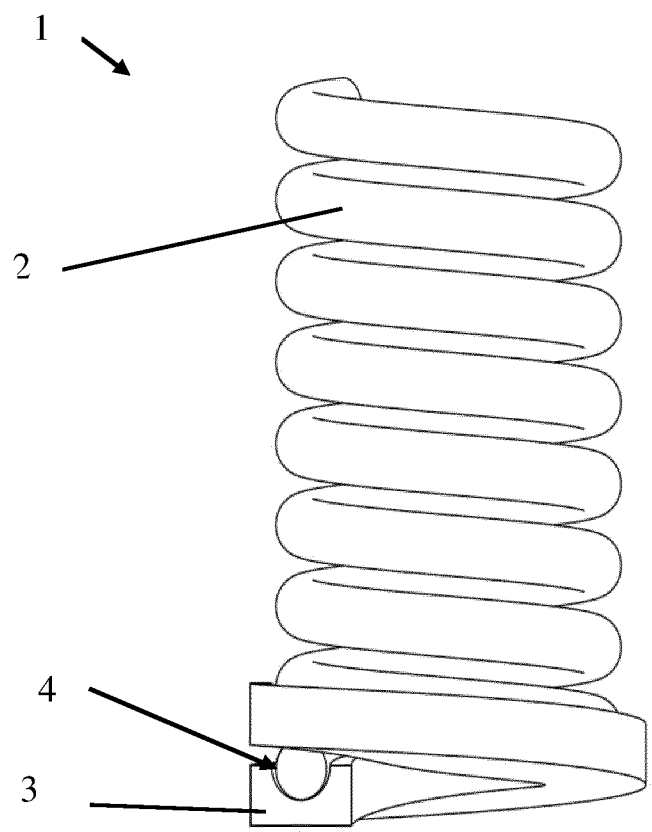
FIG. 1 is a schematic three-dimensional view of one example spring assembly.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The spring assembly according to the invention has the advantage over conventional spring assemblies that the spring assembly is better protected against environmental influences, in particular dirt, and paint damage to the helical spring caused by abrasion is partially reduced or does not occur, reducing susceptibility to breakage of the helical spring and increasing longevity.

The method according to the invention for producing a spring assembly has the advantage over conventional methods that the overall process can be optimized, in particular can be made faster in terms of time, for example also by the elimination of complex intermediate steps, and can be automated. A further advantage of the method according to the invention is that it can be integrated in a simple and reliable manner into already existing methods.

The invention therefore relates to a spring assembly for a vehicle chassis comprising a spring, in particular having a coating, a spring support and an intermediate layer, wherein the intermediate layer is arranged between the spring and the spring support, wherein the intermediate layer is at least materially connected to the spring, in particular to the coating, on the side facing the spring, and the intermediate layer lies entirely or partially against the spring support on the side facing away from the spring and is connected to the spring support by a connection other than a material connection, wherein the connection other than a material connection is a positive connection, wherein the positive connection is designed with a positive element and a negative receptacle, which receives the positive element, wherein the intermediate layer is received as a positive element in cavities of the spring support, which form the negative receptacle, or vice versa, wherein projections with undercuts of the spring support form the positive element, which is received in a negative receptacle that receives the positive element, wherein cavities in the intermediate layer form the negative receptacle.

The invention furthermore relates to a vehicle chassis comprising a spring assembly.

The invention furthermore relates to a method for producing a spring assembly for a vehicle chassis having a spring and a spring support, comprising the following steps:
a) providing a spring, in particular having a coating;
b) providing a spring support having an adhesive-repellent supporting region for supporting the spring provided in step a);
c) providing a filler;
d) applying the filler provided in step c) to the spring provided in step a) and/or to the adhesive-repellent supporting region of the spring support provided in step b);
e) producing an intermediate layer between the spring and the spring support by bringing into contact
  i. the spring provided in step a) with the adhesive-repellent supporting region of the spring support, to which supporting region filler has been applied in step d), or
  ii. the spring, to which filler has been applied in step d), with the adhesive-repellent supporting region of the spring support provided in step b), or
  iii. the spring, to which filler has been applied in step d), with the adhesive-repellent supporting region of the spring support, to which supporting region filler has been applied in step d).
f) forming a material connection, in particular an adhesive connection, between the intermediate layer produced in step e) and the spring,
wherein a connection other than a material connection is formed between the spring support, in particular the adhesive-repellent supporting region, and the intermediate layer produced in step e).

The invention furthermore relates to the use of a spring assembly for arrangement on a vehicle chassis, in particular a suspension strut.

The invention can be implemented both in the spring assembly and in a vehicle chassis comprising a spring assembly and in a method for producing a spring assembly and in the use of a spring assembly for arrangement on a vehicle chassis.

A preferred embodiment of the invention is a spring assembly for a vehicle chassis comprising a spring, in particular having a coating, a spring support and an intermediate layer, wherein the intermediate layer is arranged between the spring and the spring support, wherein the intermediate layer is at least materially connected to the spring, in particular to the coating, on the side facing the spring, and the intermediate layer lies entirely or partially against the spring support on the side facing away from the spring and is connected to the spring support by a connection other than a material connection.

For the purposes of the present invention, a connection other than a material connection is understood to mean, in particular, a nonpositive connection, a positive connection or a combination thereof. For example, a positive connection can be designed with a positive element and a negative receptacle, which receives the positive element, wherein, for example, the intermediate layer is received as a positive element in cavities, in particular in the supporting region of the spring support, which form the negative receptacle. Examples of cavities in the spring support are indentations, depressions, grooves, channels, slots, in particular T-slots, dovetail grooves, bores, blind holes, undercuts or a combination thereof. For example, the filler from which the intermediate layer is formed can flow into the abovementioned cavities, and the intermediate layer formed is thereby anchored in the cavities. For example, the positive element and the negative receptacle can also be formed the other way around, wherein projections, in particular protuberances, for example with undercuts of the spring support, form the positive element, which is received in a negative receptacle that receives the positive element, wherein cavities in the intermediate layer form the negative receptacle. The invention also encompasses all combinations of the abovementioned embodiments.

In the context of the present invention, a material connection is understood to mean those connections in which the connection partners are held together by atomic or molecular forces, such as, for example, in the case of adhesive bonding, vulcanization or a combination thereof.

In a preferred embodiment of the invention, the connection other than a material connection is a nonpositive connection and/or a positive connection.

In the context of the present invention, a compression spring is understood to mean a spring which responds at least to compressive stress. A compression spring is, for example, a coiled torsion spring, in particular a helical compression spring.

According to a preferred embodiment of the invention, the spring support is made of a plastic, in particular a flexible plastic, selected from a group of elastomers or elastomer-containing plastics, in particular polyurethane, acrylonitrile-butadiene acrylate, acrylonitrile-chlorinated polyethylene styrene, acrylonitrile-methyl methacrylate, butadiene rubber, butyl rubber, chloroprene rubber, ethylene-ethyl acrylate copolymer, ethylene-propylene-diene rubber, ethylene-vinyl acetate, fluororubber, isoprene rubber, natural rubber, polyisobutylene, polyvinylbutyral, silicone rubber, styrene-butadiene rubber, vinyl chloride-ethylene, vinyl chloride-ethylene methacrylate or a combination thereof.

In a preferred embodiment of the invention, the intermediate layer is of elastic design, in particular is an elastic sealant, an elastic adhesive or a combination thereof, and, in particular, comprises a composition which is selected from a group of acrylates, epoxy resins, polyurethanes, silicones, silane hybrid systems, polysulfides or a combination thereof.

Within the scope of the invention, the intermediate layer can be referred to, for example, as an adhesive layer, in particular because the intermediate layer is connected at least materially to the spring, in particular to the coating on the side facing the spring, in particular being adhesively bonded, vulcanized on or a combination thereof.

One advantage is that the elastic intermediate layer, in particular in the form of a relatively soft adhesive layer, can absorb part of the energy introduced into the assembly with elastic deformation in the event of a load. A favorable strain gradient is achieved since the adhesive forms a flexible layer between the coating of the spring and the elastic spring support. In particular, the stress in the boundary layer between the spring support and the adhesive is reduced. Thus, relatively small distortions are present in this region between the adhesive layer and the spring support, resulting in particularly low wear due to loading.

According to a preferred embodiment of the invention, the hardness of the intermediate layer is less than the hardness of the coating of the spring. In particular, the intermediate layer, in particular adhesive layer, which is softer than the spring coating, prevents the spring coating from being damaged at high loads.

Hardness of the intermediate layer, in particular adhesive layer, refers, in particular, to the measurable hardness of the intermediate layer in the cured state of the adhesive. In order to measure the hardness, it is possible, for example, to use the indentation method. In this method, a penetration body, also called an indenter, of defined geometry penetrates into the material to be investigated, the material of the indenter being substantially harder than the sample itself. Irrespective of the geometry of the penetration body, a force can be assigned to each penetration depth. The quotient of the two variables represents a measure of the hardness or stiffness of the sample. Known indentation methods for plastics are, for example, the Shore A method and the Shore D method. The hardness of metals can be determined according to Vickers or Brinell, for example. In this case, a penetration body is used to produce plastic deformations, which are measured by means of light microscopy and from which the hardness is determined with the aid of the contact area, the associated force and the penetration depth.

According to a preferred embodiment of the invention, the hardness of the intermediate layer is not more than 70 Shore D.

The spring support preferably consists of a flexible plastic, in particular an elastomer or a plastic containing an elastomer, for example a rubber, it also being possible in principle to use thermoplastics or thermosetting plastics as the material for the spring support.

Overall, it is favorable that the hardness of the materials used decreases in stages from the spring, which preferably consists of a hardenable spring steel, to the elastic supporting body via the interposed layers. Energy introduced into the spring can thereby also be absorbed in stages, wherein the elastic intermediate layer, in particular adhesive layer, can absorb part of the energy by deformation. Overall, this results in a favorable strain gradient between said components. In particular, the spring can have a higher hardness than the spring coating, and/or the spring coating can have a higher hardness than the intermediate layer, in particular adhesive layer, and/or the intermediate layer, in particular adhesive layer, can have a higher hardness than the spring support.

Correspondingly, according to a development, provision can be made for the stiffness also to decrease from the spring, via the spring coating, further via the intermediate layer, in particular adhesive layer, to the spring support. In particular, the spring can have a higher stiffness than the spring coating, and/or the spring coating can have a higher stiffness than the intermediate layer, in particular adhesive layer, and/or the intermediate layer, in particular adhesive layer, can have a higher stiffness than the spring support.

Conversely, the elasticity can increase from the spring, via the spring coating, further via the intermediate layer, in particular adhesive layer, to the spring support. In particular, the spring support can have a higher elasticity than the intermediate layer, in particular adhesive layer, and/or the intermediate layer, in particular adhesive layer, can have a higher elasticity than the spring coating, and/or the spring coating can have a higher elasticity than the spring.

Correspondingly, the elongation at break can also increase from the spring, via the spring coating, further via the intermediate layer, in particular adhesive layer, to the spring support.

The elongation at break characterizes the deformability or ductility of a material. The elongation at break describes the permanent change in length after fracture, based on the initial measured length of a sample in the tensile test. In particular, the spring support can have a higher elongation at break than the intermediate layer, in particular adhesive layer, and/or the intermediate layer, in particular adhesive layer, can have a higher elongation at break than the spring coating, and/or the spring coating can have a higher elongation at break than the spring.

According to a preferred embodiment of the invention, the intermediate layer has an elongation at break of at least 5%, in particular of at least 50%, preferably of at least 100%.

An upper limit for the elongation at break of the intermediate layer, in particular adhesive layer, can be, for example, not more than 300%.

In a preferred embodiment of the invention, the hardness of the coating is at least 70 Shore D.

According to a preferred embodiment of the invention, the hardness of the spring support is at least 50 Shore A and/or not more than 80 Shore A.

According to a preferred embodiment of the invention, the intermediate layer has a thickness in the range of from 0.1 mm to 10.0 mm, preferably in the range of from 0.2 mm to 7.0 mm, particularly preferably in the range of from 0.3 mm to 5 mm, very particularly preferably in the range of from 0.4 mm to 1.5 mm.

In order to produce a defined layer thickness of the intermediate layer, in particular adhesive layer, spacers can be provided, by means of which a surface of the coating and a surface of the spring support are held at a distance from one another, wherein the space formed between the surface of the coating and the surface of the spring support is at least very largely filled with the intermediate layer, in particular adhesive layer. "At least very largely" is intended, in particular, to include the possibility that the intermediate space formed between the spring support and the spring and filled with the intermediate layer, in particular adhesive layer, can also have production-related cavities or air inclusions. The intermediate space is preferably filled for the most part, in particular by at least 90%, with intermediate layer, in particular adhesive layer.

In a preferred embodiment of the invention, spacers are additionally provided, by means of which a surface of the coating and a surface of the spring support are held at a distance from one another, wherein the space formed between the surface of the coating and the surface of the spring support is at least very largely filled with the intermediate layer.

For example, the spacers can simultaneously be designed as positive elements for the formation of a positive connection. In particular, the spacers can be designed as an integral component of the spring support and/or as separate, independent elements.

According to a preferred embodiment of the invention, the spacers are arranged in a distributed manner in such a way that the spring and the spring support are aligned relative to one another in the axial direction and/or in the radial direction with respect to the spring axis.

According to a preferred embodiment of the invention, the spacers are configured in the form of projections which project from the surface of the spring support.

In a preferred embodiment of the invention, a plurality of spacers is arranged offset from one another in the circumferential direction along the winding of the spring and/or over a part of the circumference of the spring wire.

According to a preferred embodiment of the invention, the spring support is configured in such a way that, when viewed in cross section through the spring wire, the spring is received in the spring support over a contact angle range of at least 30°, preferably of at least 100°, and is connected positively to the spring support by means of the intermediate layer, wherein the intermediate layer has substantially a constant thickness in the contact region.

In a preferred embodiment of the invention, the formation of a material connection in step f) takes place in a temperature range of from 0 to 60° C., preferably in a temperature range of from 5 to 50° C., particularly preferably in a temperature range of from 5 to 40° C.

According to a preferred embodiment of the invention, the production of an intermediate layer in step e) takes place substantially without pressure.

According to a preferred embodiment of the invention, the filler provided in step c) comprises a composition which is selected from a group comprising an acrylate, an epoxy resin, a polyurethane, a silicone, a silane hybrid system, a polysulfide or a combination thereof.

In a preferred embodiment of the invention, the spring provided in step a) and/or the spring support provided in step b) additionally provides an auxiliary assembly element which at least temporarily secures the spring support on the spring with a defined spacing.

In a preferred embodiment of the invention, in a further step g), at least one spacer is provided, which at least one spacer, in a further step h), for the purpose of spacing the spring and the spring support, is arranged therebetween sequentially before the process of bringing into contact during the production of an intermediate layer in step e).

The invention also encompasses all combinations of all the abovementioned embodiments, in particular preferred embodiments.

FIG. 1 illustrates a spring assembly 1 according to one embodiment of the invention comprising a spring 2, in particular having a coating, a spring support 3 and an intermediate layer 4, wherein the intermediate layer 4 is arranged between the spring 2 and the spring support 3. The intermediate layer 4 is at least materially connected to the spring 2, in particular to the coating on the side facing the spring 2, and the intermediate layer 4 lies partially against the spring support 3 on the side facing away from the spring 2.

Figure 2:
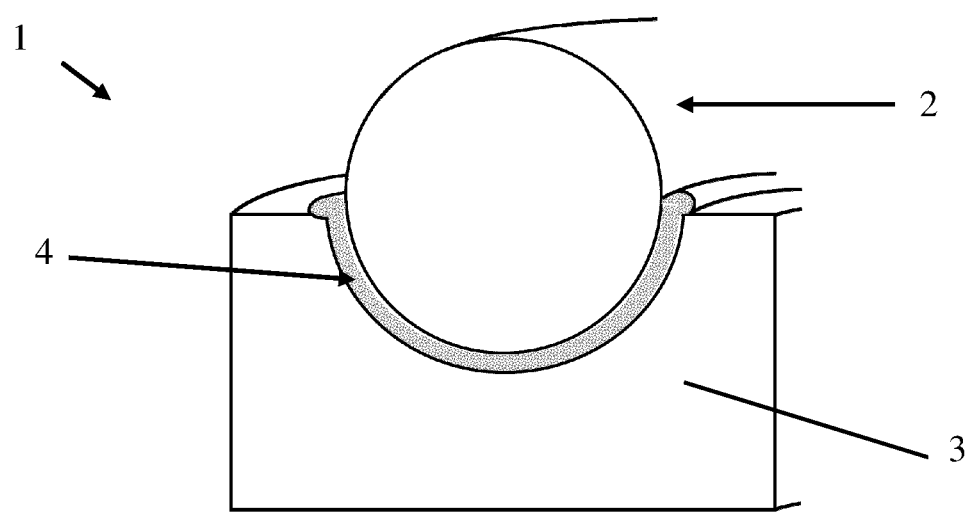
FIG. 2 is a schematic cross-sectional view in a region of the spring support according to the example shown in FIG. 1.

FIG. 2 illustrates a cross-sectional view in a region of the spring support 3 according to the embodiment of a spring assembly 1 shown in FIG. 1.

Figure 3:
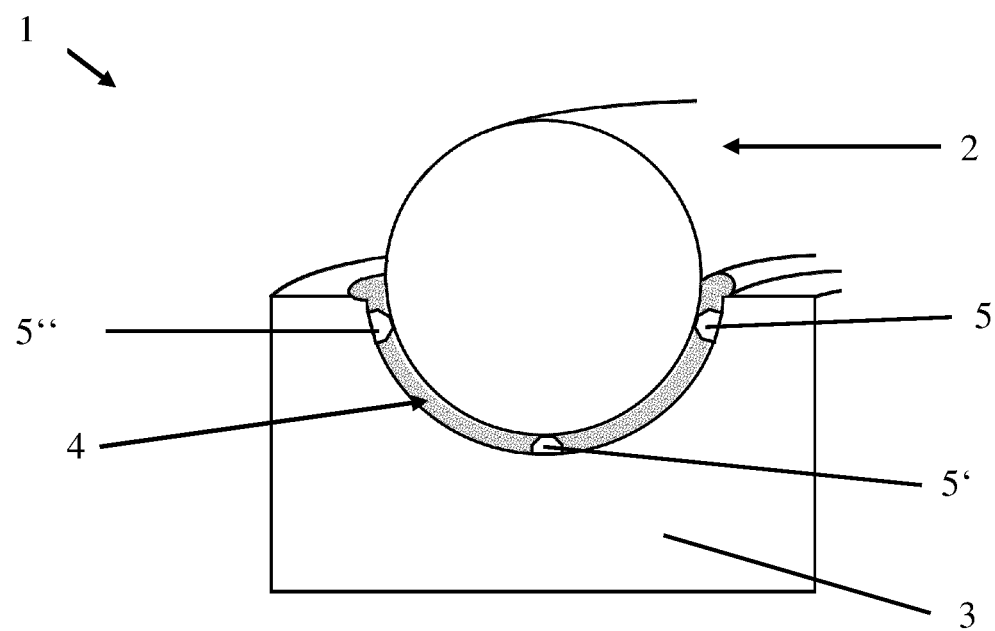
FIG. 3 is a schematic cross-sectional view of an example spring support with additional spacers.

FIG. 3 illustrates a further cross-sectional view according to FIG. 2 with additional spacers 5, 5', 5" on the spring support 3, the spacers 5, 5', 5" being used to space apart a surface of the spring 1, in particular a coating of the spring, from a surface of the spring support 3.

Figure 4:
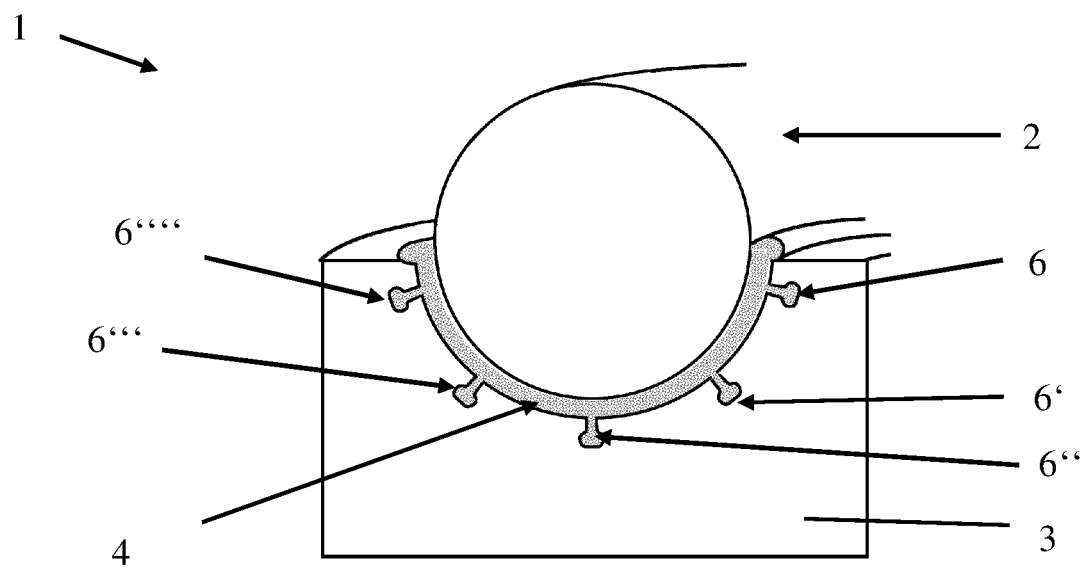
FIG. 4 is a schematic cross-sectional view of another example spring support with additional cavities.

FIG. 4 illustrates a further cross-sectional view according to FIG. 2 with additional cavities 6, 6', 6", 6''', 6'''' arranged in the spring support 3. The intermediate layer 4 is connected positively, in particular anchored, to the cavities 6, 6', 6", 6''', 6''' of the spring support 3.

Figure 5:
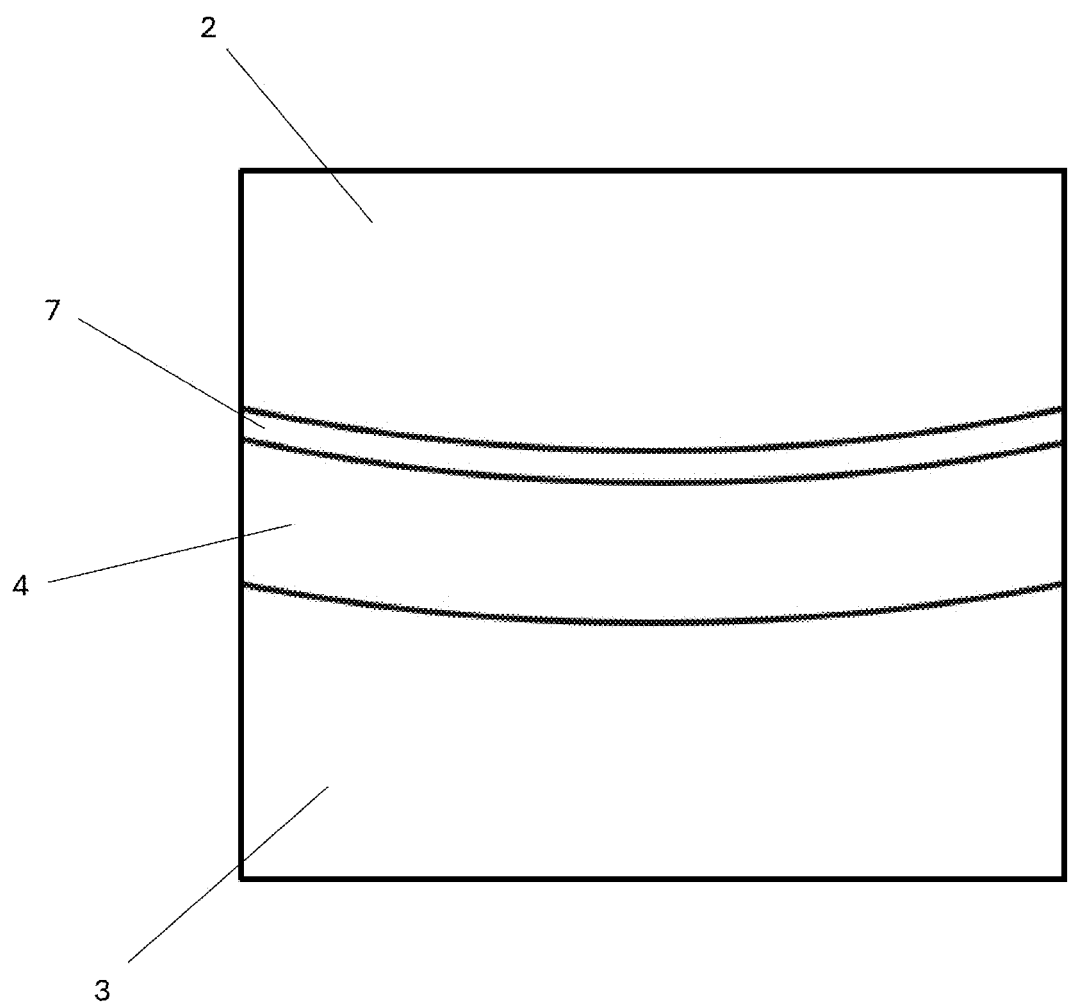
FIG. 5 is a schematic cross-sectional view of a portion of a spring assembly.

FIG. 5 is a schematic cross-sectional view of a portion of a spring assembly including a coating 7 on the spring 2.

Spring assemblies of the type described above are used in the production of vehicles, in particular of chassis of motor vehicles and/or rail vehicles.

LIST OF REFERENCE SIGNS

1=spring assembly
2=spring
3=spring support
4=intermediate layer
5, 5', 5"=spacer
6, 6' 6", 6''', 6''''=cavities

What is claimed is:

1. A spring assembly for a vehicle chassis, comprising:
a spring that has a coating;
a spring support that has an adhesive-repellent supporting region for supporting the spring; and
an intermediate layer arranged between the spring and the spring support, wherein the intermediate layer includes an adhesive;
wherein the intermediate layer is at least materially connected to the coating on a side facing the spring;
wherein the intermediate layer lies entirely or partially against the spring support on a side facing away from the spring and is connected and anchored to the adhesive-repellent supporting region of the spring support by a connection other than a material connection;
wherein the connection is a positive connection configured with positive elements and negative receptacles that receive the positive elements;
wherein either:
projections with undercuts of the intermediate layer are received as the positive elements in undercut cavities of the spring support that form the negative receptacles, or
projections with undercuts of the spring support form the positive elements, with the positive elements being received in the negative receptacles, wherein undercut cavities in the intermediate layer form the negative receptacles.

2. The spring assembly of claim 1 wherein the connection is the positive connection and a nonpositive connection.

3. The spring assembly of claim 1 wherein the spring support is comprised of a flexible plastic selected from a group of polyurethane, acrylonitrile-butadiene acrylate, acrylonitrile-chlorinated polyethylene styrene, acrylonitrile-methyl methacrylate, butadiene rubber, butyl rubber, chloroprene rubber, ethylene-ethyl acrylate copolymer, ethylene-propylene-diene rubber, ethylene-vinyl acetate, fluororubber, isoprene rubber, natural rubber, polyisobutylene, polyvinylbutyral, silicone rubber, styrene-butadiene rubber, vinyl chloride-ethylene, vinyl chloride-ethylene methacrylate, or a combination thereof.

4. The spring assembly of claim 1, wherein the intermediate layer comprises a composition that is selected from a group of acrylates, epoxy resins, polyurethanes, silicones, silane hybrid systems, polysulfides, or a combination thereof.

5. The spring assembly of claim 1 wherein a hardness of the intermediate layer is less than a hardness of the coating of the spring.

6. The spring assembly of claim 1 wherein a hardness of the intermediate layer is at most 70 Shore D.

7. The spring assembly of claim 1 wherein the intermediate layer has an elongation at break of at least 50%.

8. The spring assembly of claim 1 wherein the intermediate layer has a thickness in a range of 0.1 mm to 10.0 mm.

9. The spring assembly of claim 1 comprising spacers by way of which a surface of the coating and a surface of the spring support are held at a distance from one another, wherein a space formed between the surface of the coating and the surface of the spring support is filled with the intermediate layer.

10. The spring assembly of claim 9 wherein the spacers are distributed such that the spring and the spring support are aligned relative to one another in an axial direction and/or in a radial direction with respect to a spring axis.

11. The spring assembly of claim 10 wherein the spacers are configured as projections that project from the surface of the spring support.

12. The spring assembly of claim 1 wherein the spring support is configured such that when viewed in cross section through a spring wire the spring is received in the spring support over a contact angle range of at least 30° and is connected positively to the spring support by the intermediate layer, wherein the intermediate layer has a constant thickness in a contact region at the spring support.

13. A vehicle chassis comprising the spring assembly of claim 1.

14. The spring assembly of claim 1 wherein the intermediate layer is anchored as the positive element in cavities of the spring support that form the negative receptacle.

15. The spring assembly of claim 1 wherein the undercut cavities include T-slots.

16. The spring assembly of claim 1 wherein the undercut cavities include dovetail grooves.

17. The spring assembly of claim 1 wherein the intermediate layer includes an elastic adhesive.

18. A method for producing a spring assembly for a vehicle chassis, the method comprising:
 a) providing a spring that has a coating;
 b) providing a spring support that has an adhesive-repellent supporting region for supporting the spring;
 c) providing a filler;
 d) applying the filler to the spring and/or to the adhesive-repellent supporting region of the spring support;
 e) producing an intermediate layer between the spring and the spring support by bringing into contact
  i) the spring with the adhesive-repellent supporting region of the spring support, to which supporting region the filler has been applied,
  ii) the spring, to which the filler has been applied, with the adhesive-repellent supporting region of the spring support, or
  iii) the spring, to which the filler has been applied, with the adhesive-repellent supporting region of the spring support, to which supporting region the filler has been applied; and
 f) forming a material, adhesive connection between the intermediate layer produced in step (e) and the spring, wherein an anchoring connection other than a material connection is formed between the adhesive-repellent supporting region of the spring support and the intermediate layer produced in step (e), wherein the anchoring connection is a positive connection configured with projections anchored in undercut cavities.

* * * * *